US008027283B2

(12) United States Patent
Park et al.

(10) Patent No.: US 8,027,283 B2
(45) Date of Patent: Sep. 27, 2011

(54) METHOD AND APPARATUS FOR WAITING TIME GAIN OF USER EQUIPMENT THROUGH EFFICIENT PROCESS OF ASSIGNED SLOT IN MOBILE COMMUNICATION SYSTEM

(75) Inventors: Jae-Hong Park, Suwon-si (KR); Byeong-Yun Lee, Suwon-si (KR); Jae-Won Kim, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1170 days.

(21) Appl. No.: 11/708,699

(22) Filed: Feb. 19, 2007

(65) Prior Publication Data

US 2007/0211688 A1  Sep. 13, 2007

(30) Foreign Application Priority Data

Feb. 17, 2006 (KR) .......................... 10-2006-0015558

(51) Int. Cl.
*G08C 17/00* (2006.01)

(52) U.S. Cl. ........ 370/311; 370/318; 370/352; 370/359; 455/574; 455/127.5; 455/434

(58) Field of Classification Search .................. 455/574, 455/127.5, 434; 370/311, 318, 252, 259
See application file for complete search history.

(56) References Cited

U.S. PATENT DOCUMENTS

| 5,596,315 | A  | * | 1/1997  | Olds et al. ..................... 340/7.2 |
| 6,480,476 | B1 |   | 11/2002 | Willars |
| 6,496,489 | B1 |   | 12/2002 | Raith et al. |
| 6,829,493 | B1 |   | 12/2004 | Hunzinger |
| 2002/0090959 | A1 | | 7/2002 | Laroia et al. |
| 2003/0031140 | A1 | * | 2/2003 | Oprescu-Surcobe et al. 370/311 |
| 2004/0091022 | A1 | | 5/2004 | Sarkar et al. |

FOREIGN PATENT DOCUMENTS

| JP | 8-508629   | 9/1996  |
| JP | 2003-536286 | 12/2003 |
| JP | 2005-526415 | 9/2005  |

* cited by examiner

*Primary Examiner* — Kent Chang
*Assistant Examiner* — Dung Lam
(74) *Attorney, Agent, or Firm* — The Farrell Law Firm, P.C.

(57) ABSTRACT

Disclosed is a method and apparatus for increasing the waiting time of a User Equipment (UE) through an efficient processing of assigned slots. The method includes processing a first 10 ms half frame of the assigned slot initially when the assigned slot is processed, identifying a general page message located in the first half frame, and performing a transition operation into a sleep state, when the general page message corresponds to a null general page message having no paging information and no control information to be updated.

7 Claims, 6 Drawing Sheets

| | |
|---|---|
| SOM (Start Of Message) | 1 |
| MSG_LEN | 8 |
| MSB_TYPE | 8 |
| CONFIG_MSG_SEQ | 6 |
| ACC_MSG_REQ | 6 |
| CLASS_0_DONE | 1 |
| TMSI_DONE | 1 |
| CLASS_1_DONE | 1 |
| ORDERED_TMSIS | 1 |
| BROADCAST_DONE | 1 |
| RESERVED | 4 |
| ADD_LENGTH | 3 |
| ADD_PFIELD | V |
| PAGE RECORD | V |
| PDU_PADDING | V |
| CRC | 30 |

FIG.2
(PRIOR ART)

METHOD AND APPARATUS FOR WAITING TIME GAIN OF USER EQUIPMENT THROUGH EFFICIENT PROCESS OF ASSIGNED SLOT IN MOBILE COMMUNICATION SYSTEM

PRIORITY

This application claims the benefit under 35 U.S.C. 119(a) of an application entitled "Method And Apparatus For Waiting Time Gain Of User Equipment Through Efficient Process Of Assigned Slot In Mobile Communication System" filed in the Korean Intellectual Property Office on Feb. 17, 2006 and assigned Serial No. 2006-15558, the contents of which are incorporated herein by reference.

BACKGROUND OF THE INVENTION

1. Field of the Invention

The present invention relates generally to a synchronous mobile communication system (e.g., cdmaOne, cdma2000 1x), and more particularly to a method and apparatus for increasing the battery waiting time of a User Equipment (UE) through an efficient processing of assigned slots.

2. Description of the Related Art

In a synchronous mobile communication system, a UE generally searches a paging channel and receives and processes paging and control information while in a waiting state. In this case, the UE operates in either a slotted or non-slotted mode. In the slotted mode, an entire paging channel is divided into 80 ms slots, and a UE searches only a slot promised between the UE and node B. In the non-slotted mode, all slots are searched. A slot includes 4 frames, each of which has a data processing unit of 20 ms. When the mobile communication system operates in the slotted mode, the UE transits into an active state and searches a paging channel only during assigned slots, and enters a sleep state without searching a paging channel during non-assigned slots. During the sleep state, the operations of a Radio Frequency (RF) modem, a Central Processing Unit (CPU) and other hardware devices are stopped, thereby reducing battery power consumption.

In this case, the node B and UE may calculate a promised slot by using the following Equation (1).

$$(\lfloor t/4 \rfloor - PGSLOT) \bmod (16 \times 2^i) = 0 \quad (1)$$

In Equation 1, "t" represents a system time with a unit of 20 ms, "PGSLOT" represents a value commonly known by the node B and the UE through the unique telephone number of the UE and has a value within a range of 0 to 2047 according to UEs. In addition, "i" refers to a slot cycle index representing a paging channel searching period, and has a value within a range of 0 to 7. As the value of the slot cycle index increases, the paging channel searching period increases, so that a time period during which the UE stays in the sleep state is also extended. For example, when "i" has a value of "0," an assigned slot is searched once every 1.28 seconds, and when "i" has a value of "2," the assigned slot is searched once every 5.12 seconds. During the waiting state, the UE generally operates in the slotted mode.

The cases in which the UE operates in the non-slotted mode will now be described with reference to the fields of a paging message shown in FIG. 2.

1. When control information changes (i.e., when current control information which the UE has is unavailable), the UE operates in the non-slotted mode.

The control information includes node B configuration information and access parameter information. When the node B configuration information changes, it can be recognized by checking a CONFIG_MSG_SEQ field included in the node B configuration message and a page message. Since the UE must again receive all node B configuration messages when the node B configuration information changes, the UE operates in the non-slotted mode so as to update the node B configuration information as soon as possible. Also, when access parameter information changes, it can be recognized by checking an ACC_MSG_SEQ field included in an access parameter message and a page message. Similarly, when the access parameter information changes, the UE operates in the non-slotted mode so as to update the access parameter information.

2. When the UE transmits a message to the node B through an access channel "ACH" and waits for an acknowledgement of the message, the UE operates in the non-slotted mode.

Since message transmission through an access channel is performed through connectionless communication without a logical path for connection to the node B, it is necessary for the UE to receive delivery confirmation. In this case, although an assigned slot has passed, the UE must not enter the sleep state before receiving a response to the message.

3. The UE operates in the non-slotted mode when it is established to do so.

In cases other than the above three cases, the UE may also enter the slotted mode so as to save power. FIG. 1 illustrates the configuration of a slot in a conventional mobile communication system, in which slot various types of messages are arranged according to a predetermined rule. In FIG. 1, a paging channel is shown having a unit of 20 ms frame in which the configuration of an assigned slot is shown.

In the paging channel, mobile addressed messages, such as an Order Message (ORDM) and an Enhanced Channel Assignment Message (ECAM), to be transmitted from node B to a specific UE are generally positioned at the front portion of the paging channel. When there is no message to be transmitted from the node B to the UE, the corresponding portion is empty. In the portion following the front portion, a General Page Message (GPM) used when the node B pages a specific UE is inserted, and the remaining portions of the slot are filled with an OVerHeaD message (OVHD) containing configuration and access information, which are commonly transmitted to all UEs registered in the node B. FIG. 1 shows the earliest point at which a UE can transit into a sleep state in an assigned slot.

When operating in the slotted mode, the UE searches an assigned slot. When it is determined that there is no paging information related to the UE, and configuration information stored in the UE is available, the UE enters the sleep state. In contrast, when there is paging information during the assigned slot, or when configuration information changes, the UE must perform an operation necessary for call connection or receive changed configuration information, without entering the sleep state. However, in this case, it is unnecessary for the UE to search all of the assigned slot. This is because when checking only a part of the contents of a paging message initially received in an assigned slot, the UE may enter the sleep state without checking the contents of the following messages in the assigned slot.

For example, in cdma2000 1x, a General Page Message (GPM) contains: a CONFIG_MSG_SEQ field representing whether node B configuration information changes; an ACC_MSG_REQ field representing whether access parameter information changes; CLASS_0_DONE field, CLASS_1_DONE field, TMSI_DONE field, and a BROADCAST_DONE field (hereinafter DONE fields), that represent whether a page message for each group, to which UEs belong, exists in a slot assigned according to each corresponding group; and a PAGE_RECORD field representing the unique number of an actually paged UE. Among these fields, when the value of the CONFIG_MSG_SEQ field or of the ACC_MSG_REQ field changes to a value other than that stored in the UE, it is necessary to update the node B configuration information or access parameter information.

Herein, through the DONE fields registered in the UE, the UE can determine whether it is necessary to receive a message following a currently received general page message. For example, when a DONE field has a value of "1," the UE does not need to receive a following message in an assigned slot, but when the DONE field has a value of "0," the UE must continuously receive the following message. That is, after checking the fields of the general page message, when the UE determines that there is no configuration information and/or access information to be updated, and it is unnecessary to check the following messages, the UE may transit into the sleep state. Although the above description is given in terms of processing a general page message in the cdma2000 1x system, the operations may be applied to the cdmaOne system in such a manner as to check the fields of a Page Message (PM).

As described above, a. UE being in the slotted mode can transit into the sleep state so as to save power.

Since the UE usually operates in the slotted mode, power consumption decreases as the UE transits faster into the sleep state. Therefore, a rapid sleep state entry method is required.

FIG. 3 illustrates a conventional paging channel processing operation in which a UE starts to operate at a slot boundary, receives and processes a message, and then transits into the sleep state.

A roll boundary represents the starting point of a short PN code having a 26.666 ms period, which is used in a synchronous mobile communication system.

When the UE is in the sleep state, the state of the PN code is not updated. In this case, since the state of the PN code of the node B is being continuously updated, the UE must perform an operation to adjust the state of its own PN code to match that of the node B when the UE wakes up from the sleep state. To this end, the prior art is designed to enable sleep state entry and active state entry only at the roll boundary.

Meanwhile, the UE decodes paging channel data by generally using a Viterbi decoder (not shown). The Viterbi decoder reports a result of decoding to a processor through interrupt every 20 ms on the basis of a slot boundary. Herein, the "processor" may be a typical processing unit of the UE, an application of a controller, or software.

Therefore, as shown in FIG. 3, a conventional UE processing a paging channel at an active state causes a decoding delay due to the Viterbi decoder. That is, when an interrupt of 20 ms occurs, data reported from the decoder to the processor includes portions of a previous frame and portions of a current frame, because the conventional paging channel processing method processes paging channel data in a unit of 20 ms frame.

Consequently, in order for the UE to enter the sleep state, the Viterbi decoder must wait until the second decoder interrupt #2 occurs so that the processor can process data of the first frame in an assigned slot, and then the UE can enter the sleep state at the second roll boundary.

That is, data #1 obtained from decoder interrupt #1 of the first frame and a portion of data #2 obtained from decoder interrupt #2 of the second frame due to the decoding delay are processed in units of 20 ms frames, and then it is determined based on a result of the processed data whether to enter the sleep state.

In this case, the processor must actually wait for 40 ms after a slot starts, before the processor performs the first processing operation with respect to paging channel data.

When the first frame data includes a general page message which has no paging and control information to be updated, the UE can transit into the sleep state at a roll boundary after the first frame data. In contrast, when the above conditions are not satisfied, the second frame must be used to determine whether to transit into the sleep state, so that an actual transition into the sleep state is further delayed.

As described above, according to the conventional procedure of starting at a slot boundary, receiving and processing a message, and performing a transition operation into the sleep state, there is a problem in that the earliest the UE can transit into the sleep state is at the second roll boundary.

This results in a delay in the sleep-state transition time point of the UE, thereby unnecessarily extending the time during which an RF receiver is in an on-state.

Therefore, it is necessary to develop an efficient sleep-state entry method considering such a decoding delay.

SUMMARY OF THE INVENTION

Accordingly, the present invention has been made to solve the above-mentioned problems occurring in the prior art, and the present invention discloses a method and apparatus for increasing the battery waiting time of a UE through variable processing of an assigned slot in a mobile communication system.

The present invention also discloses a method and apparatus for enabling a UE to enter a sleep state even at a first roll boundary, by processing frame data of an assigned slot half frame by half frame so as to reduce a processing delay of a processor as much as possible.

In addition, the present invention discloses a method and apparatus, in which data transferred to the decoder is processed half frame by half frame initially after the start of a slot, and is then processed full frame by full frame, so as to achieve a rapid determination for transition into the sleep state, so that the one-roll (26.666 ms) faster transition into the sleep state can prevent the waste of electric power during the time of one roll occurring in the prior art.

In addition, the present invention discloses a method and apparatus for rapidly determining whether to enter a sleep state, in such a manner that the processor does not upload data on an upper layer for processing of the data and directly checks only a desired field in a lower layer in a mobile communication system in order to reduce a processing delay in processing an assigned slot.

In accordance with an aspect of the present invention, there is provided a method for increasing a waiting time of a UE through efficient processing of an assigned slot in a mobile communication system, including processing a first 10 ms half frame of the assigned slot initially when the assigned slot is processed, identifying a general page message located in the first half frame, and performing a transition operation into a sleep state, when the general page message corresponds to a null general page message having no paging information and no control information to be updated.

In accordance with another aspect of the present invention, there is provided an apparatus for increasing a waiting time of a UE through efficient processing of an assigned slot in a mobile communication system, including a sleep driver for interleaving and decoding a received signal, and driving a sleep state, a data output controller for determining whether a frame corresponds to a first frame in an assigned slot, and allowing only a 10 ms half frame to be output when the frame corresponds to the first frame and allowing frames following the half frame to be output full frame by full frame so that the output frames are decoded by a decoding process of the sleep driver, and a sleep state controller for receiving data of the half frame, checking the fields of a general page message, and determining whether to enter the sleep state.

BRIEF DESCRIPTION OF THE DRAWINGS

The above and other aspects, features and advantages of the present invention will be more apparent from the following detailed description taken in conjunction with the accompanying drawings, in which:

FIG. 2 illustrates the fields of a general page message;

DETAILED DESCRIPTION OF THE PREFERRED EMBODIMENT

Hereinafter, a preferred embodiment of the present invention will be described with reference to the accompanying drawings. In the following description, a detailed description of known functions and configurations incorporated herein will be omitted for the sake of clarity and conciseness. In addition, the terminology used in the description is defined in consideration of the function of corresponding components used in the present invention and may be varied according to users, operator's intention or practices. Accordingly, the definition must be interpreted based on the overall content disclosed in the description.

The present invention discloses a method and apparatus for enabling a UE to enter a sleep state even at a first roll boundary, by enabling frame data of an assigned slot to be processed half frame by half frame and reducing the processing delay of a processor as much as possible.

According to the present invention, frame data of an assigned slot are processed half frame by half frame at first, thereby enabling the UE to more rapidly transit into the sleep state. Accordingly, the present invention has an advantage in that the waiting time of the UE is significantly increased.

In other words, according to the prior art, since data of a paging channel is processed frame by frame, there is a problem in that the earliest the UE can transit into the sleep state is the second roll boundary after a slot boundary. The present invention, in contrast, enables the UE to enter the sleep state even at one-roll time point after a slot boundary by processing the data of the first frame of an assigned slot half frame by half frame.

When there are many UEs operating in a slotted mode in an equal synchronous mobile communication system, the same slot may be assigned to a plurality of UEs. Therefore, the node B can page a plurality of UEs by using one slot.

When the node B does not need to page any UE and does not have any control information to be updated in a specific slot, half frame #1 410 contains a GPM, which corresponds to a null GPM having no paging information.

Figure 1:
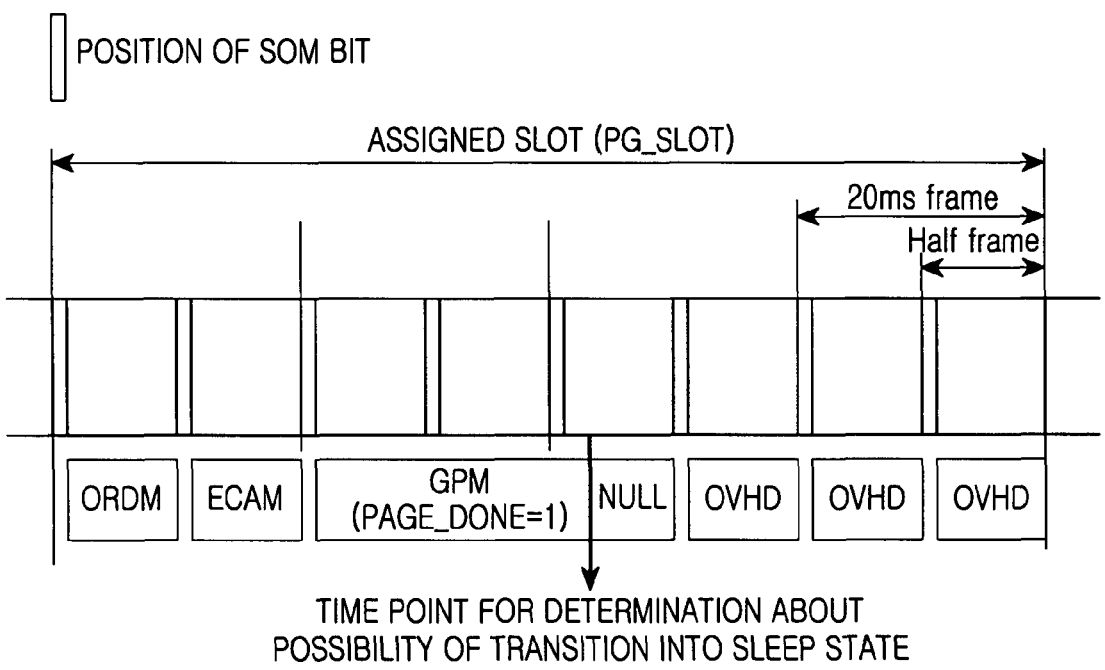
FIG. 1 illustrates the configuration of a slot in a conventional mobile communication system.
Figure 3:
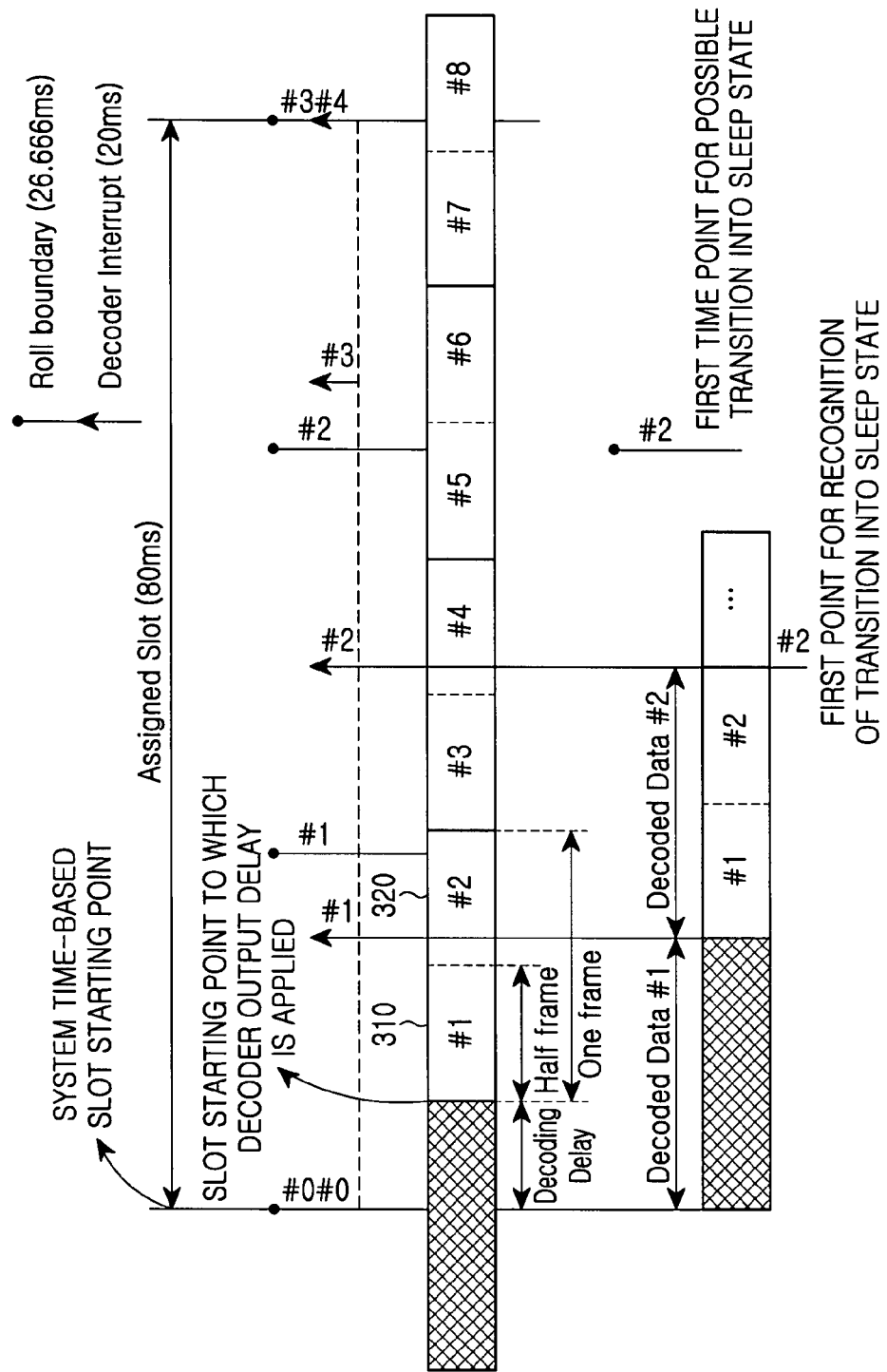
FIG. 3 illustrates a conventional paging channel processing operation.
Figure 4:
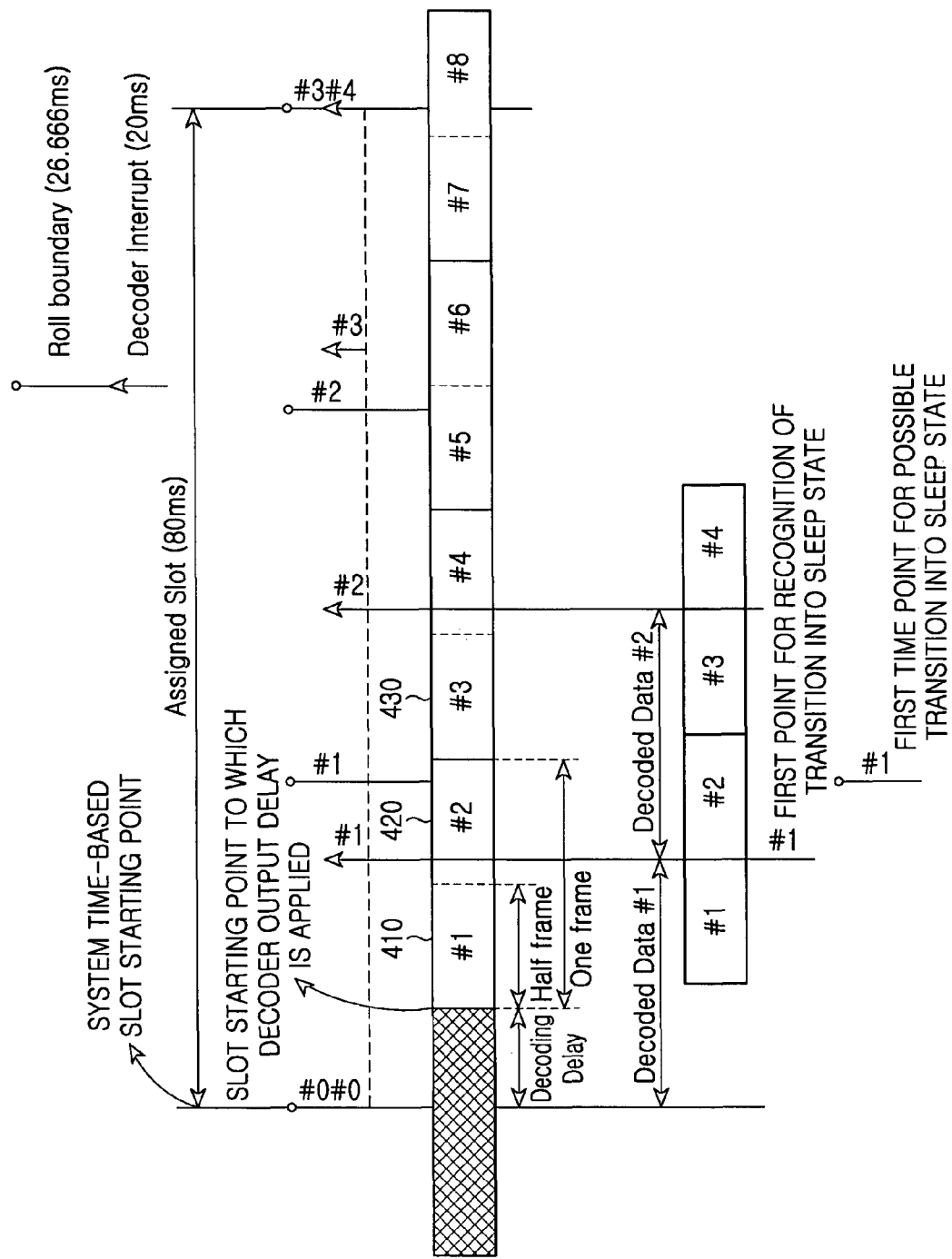
FIG. 4 illustrates a paging channel processing operation according to an embodiment of the present invention.

FIG. 4 illustrates a paging channel processing operation according to an embodiment of the present invention.

When a first half frame of a slot contains a null general page message, which has no paging and control information to be updated, a UE can rapidly transit into a sleep state after checking only the first half frame #1 410. When data contents of the first half frame do not coincide with a rapid sleep-state transition condition, the UE can check once more if data contents coincide with the rapid sleep-state transition condition by using the next 20 ms frame including half frames #2 420 and #3 430. When the half frame #3 430 among frame data obtained through a second decoder interrupt satisfies the sleep-state transition condition, the present invention enables the UE to enter the sleep state at roll boundary #2, unlike the prior art which allows the UE to enter the sleep state at roll boundary #3.

When the general page message illustrated in FIG. 2 corresponds to a null general page message, in which page-related information fields have no contents, the general page message does not include PAGE_RECORD and ADD_PFIELD fields and has a total of 72 bits including a 2-bit PDU_PADDING field, not including the 1-bit Start of Message (SOM). Therefore, the general page message may include one entire message including CRC bits in a 10 ms half frame thereof. In order to enable the UE to transit into the sleep state at the first frame, the following four conditions must all be satisfied, as described above.

1. Does a first message of contents of a first frame correspond to a general page message?

2. When it is a general page message, is there no paging information to a UE itself?

3. Is there no change in control information currently stored in the UE?

4. Does a DONE field, that represents the necessity of message reception, following the general page message have a value of "1"?

In addition, when a processor processes paging channel data, a processing delay is caused by the processor. When a low-speed processor is used as that in the UE, a greater processing delay is caused by the processor. Therefore, in order to minimize the processing delay, the processor must process demodulated data as soon as it receives the demodulated data after a decoder interrupt has been generated. Although a time difference between roll boundary #1 and decoder interrupt #1 is 6.666 ms, a time margin is required in order to transit hardware into the sleep state. When a processing delay caused by the processor exceeds the time margin, the UE can only transit into the sleep state not at roll boundary #1 but at roll boundary #2 after 26.666 ms, so it is important to minimize the processing delay.

In order to check the fields of a general page message in a synchronous mobile communication system, it is necessary to demodulate frame data in a physical layer, to create one message in a link access control layer, and then to transfer the message to a signalling layer. Although the above description has been given in reference to an example in which a general page message of the cdma2000 1x system is processed, operations similar to the aforementioned operations may be performed even in the case of checking fields of a page message in the cdmaOne system. When the contents of a message are checked through the aforementioned procedure, the processing delay caused by the processor considerably increases.

The method and apparatus according to the present invention processes a general page message in a lower layer in advance, without passing through the aforementioned procedure, so that the processing delay caused by the processor is minimized, thereby securing a time margin for transiting hardware into the sleep state.

Figure 5:
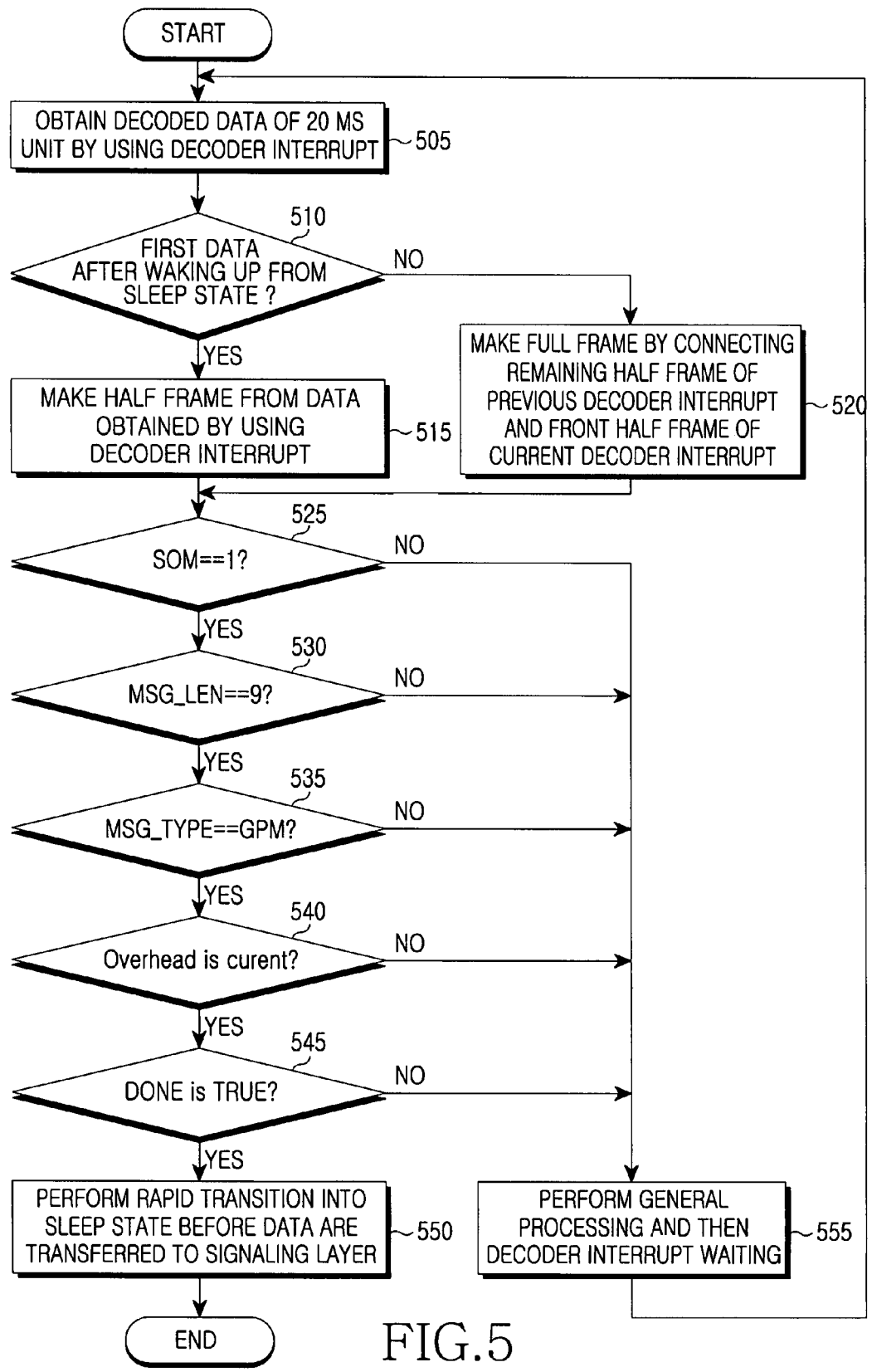
FIG. 5 illustrates a procedure for a rapid transition into a sleep state according to an embodiment of the present invention.

FIG. 5 illustrates a procedure for a rapid transition into the sleep state according to an embodiment of the present invention.

In step 505, a first decoder interrupt for 20 ms data is generated. When it is determined in step 510 that data obtained after step 505 corresponds to data first decoded at the starting point of an assigned slot after waking up from a sleep state, step 515 is performed to first process half frame #1, and then step 525 is performed. In contrast, when it is determined in step 510 that the data does not correspond to decoded data, step 520 is performed to make a full frame by connecting the remaining half frame of a previous decoder interrupt and a front half frame of a current decoder interrupt, and then step 525 is performed.

In step 525, it is determined whether a first message among contents of a first frame refers to a general page message. That is, it is first determined whether the Start Of the Message (SOM) field in a page message has a value of "1". Therefore, when a new message starts, the SOM field must always have a value of "1." When there is no paging information during an assigned slot, half frame #1 is constructed as a null general page message. When it is determined that the SOM field has a value of "1," step 530 is performed. The 8 bits following the SOM field corresponds to a field representing a message length "MSG_LEN" of a byte unit, in which a null general page message has a length of 9 bytes. Therefore, it is determined in step 530 that the message length recorded in the message length field is 9 bytes, and then step 535 is performed.

In step 535, when it is determined that an 8-bit message type "MSG_TYPE" field following the message length field has a code of "0x11" which is a unique code of the general page message, it is determined that the corresponding message is a null general page message having a length of 5 bytes, and step 540 is performed. In step 540, 6-bit CONFIG_MSG_SEQ field and 6-bit ACC_MSG_SEQ field, which sequentially follow the MSG_TYPE field, are checked to determine whether configuration information is updated. When it is determined that it is unnecessary to update configuration information, step 545 is performed to finally check a DONE field. When the DONE field has a value of "1," it indicates that current values following the null general page message satisfy all conditions, so that it is possible to immediately transit into the sleep state (step 550). In addition, when half frame #1 satisfies the conditions, a lower layer can perform determination for a transition into the sleep state without the determination by the signalling layer (upper layer), so that the processing delay caused by the processor is minimized, thereby enabling the UE to rapidly transit into the sleep state.

In contrast, when any one among the conditions of steps 525 to 545 is not satisfied, in step 555 a normal processing operation of transferring the message to a link access control layer and a signalling layer so as to process the message is performed, and then the procedure returns to step 505.

Although the above description has been given in reference to an example in which a general page message in the cdma2000 1x system is processed, a rapid transition into the sleep state is possible by performing operations similar to the aforementioned operations even when a page message in the cdmaOne system is processed.

Figure 6:
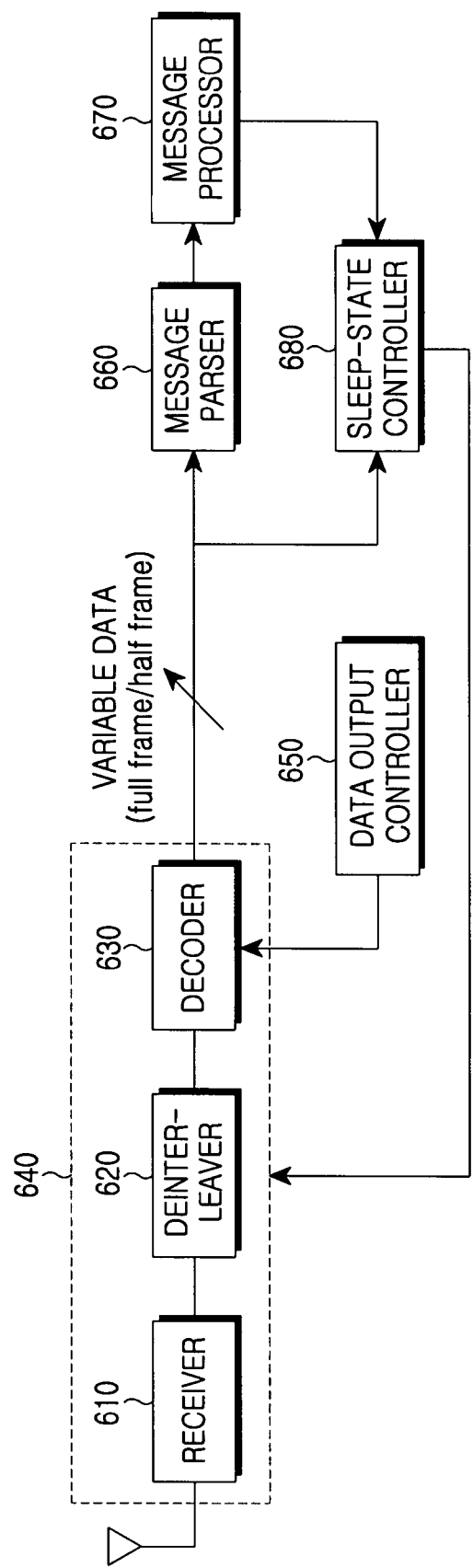
FIG. 6 illustrates the configuration of a user equipment according to an embodiment of the present invention.

FIG. 6 illustrates the configuration of a UE according to an embodiment of the present invention.

A transmitted signal is received by a receiver 610, is subjected to a deinterleaving process through a deinterleaver 620, and then is input to a decoder 630. The decoder 630 performs a decoding operation with respect to a deinterleaved signal, and transfers the decoded signal either to a message parser 660 or to a sleep-state controller 680 according to a control signal input from a data output controller.

The data output controller 650 determines whether a corresponding frame is a first frame in an assigned slot. Then, when the corresponding frame is the first frame, the data output controller 650 causes only a half frame among output data of the decoder 630 to be transferred to the message parser 660 and sleep-state controller 680, and when the corresponding frame is a second or later frame, the data output controller 650 causes a full frame to be transferred to the message parser 660 and sleep-state controller 680. The message parser 660 parses data received from the decoder 630 and then transfers the parsed data to a message processor 670. The sleep-state controller 680 determines whether to enter the sleep state either by processing the half frame received from the decoder 630 or based on a processing result received from the message processor 670.

In detail, when receiving a half frame from the decoder 630, the sleep-state controller 680 can also check the GPM field, so that the sleep-state controller 680 can determine whether to enter the sleep state, even before receiving a processed signal from the message processor 670 processing an upper layer. When the sleep-state controller 680 determines that a current time corresponds to a time point at which it is possible to transit into the sleep state, the sleep-state controller 680 transmits a control signal for transition into the sleep state to a sleep driver 640, thereby causing the UE to be shifted into the sleep state.

As the present invention enables the UE to more rapidly transit into the sleep state as compared with the prior art, it is possible for the UE to obtain a waiting time gain. As a result of checking a waiting time gain through a test in cdma2000 1x/cdmaOne commercial networks, it was determined that most UEs operating in the slotted mode satisfy the slot state transition conditions with a first half frame, and especially at night when many null general page messages are transmitted, almost all UEs operating in the slotted mode satisfy the slot state transition conditions with a first half frame.

Therefore, when the slot state transition conditions are satisfied with the first half frame, when it is assumed that the active state maintenance time of a UE according to the conventional method is 100 ms in order to process an assigned slot every cycle, the active state maintenance time of a UE according to the present invention is reduced to 73.33 ms. As a result, when communication and a handoff are not generated, there is no update of control information, and the slot state transition conditions are satisfied with the first half frame in every assigned slot, power consumption is reduced by 26.66% as compared with the prior art.

In addition, when 50% of all assigned slots correspond to the case in which the slot state transition conditions are satisfied with a second half frame, and the remaining 50% corresponds to the case in which the slot state transition conditions are satisfied with a first half frame, power consumption is reduced by 13.33% as compared with the prior art.

While the present invention has been shown and described with reference to certain preferred embodiments thereof, it will be understood by those skilled in the art that various changes in form and details may be made therein without departing from the spirit and scope of the invention as defined by the appended claims. Accordingly, the scope of the invention is not to be limited by the above embodiments but by the claims and the equivalents thereof.

What is claimed is:

1. A method for increasing a waiting time of a User Equipment (UE) through efficient processing of an assigned slot in a mobile communication system, the method comprising the steps of:
   determining whether a frame corresponds to a first frame in an assigned slot;
   when the frame of the assigned slot is the first frame:
      processing only a half of a frame of the assigned slot when the frame corresponds to a first frame;
      identifying a general page message located in the half of the first frame; and
      performing a transition operation of the UE into a sleep state, when the general page message has no paging information and no control information to be updated; and
   when the frame of the assigned slot is not the first frame, processing a full frame.

2. The method as claimed in claim 1, wherein when the assigned slot is processed, it is determined whether to enter the sleep state, by checking a field of a page message desired to be processed in a lower layer in a processor.

3. The method as claimed in claim 1, further comprising performing an operation for determination of transition into the sleep state by full frame processing of frames following the first half frame, when the first half of the first frame does not include the general page message.

4. The method as claimed in claim 1, wherein the general page message is determined to be the null general page message having no paging information and no control information to be updated, provided that, in the general page message, a Start of Message (SOM) field has a value of "1," a message length "MSG_LEN" field has a value of "9," a message type "MSG_TYPE" field has a value representing a general page message, updates of a configuration information "CONFIG_MSG_SEQ" field and an access parameter information "ACC_MSG_SEQ" field are unnecessary, and DONE fields including CLASS_0_DONE, CLASS_1_DONE, TMSI_DONE, and BROADCAST_DONE and representing whether a message is received have a value of "1."

5. An apparatus for increasing a waiting time of a User Equipment (UE) through efficient processing of an assigned slot in a mobile communication system, the apparatus comprising:
   a sleep driver for interleaving and decoding a received signal, and driving a sleep state;
   a data output controller for determining whether a frame corresponds to a first frame in an assigned slot, and controlling the sleep driver to output only a half frame when the frame corresponds to the first frame and to output full frames following the half frame; and
   a sleep state controller for receiving data of the half frame, checking a field of a general page message, and determining whether to enter the sleep state.

6. The apparatus as claimed in claim 5, further comprising:
   a message parser for parsing a received signal and outputting the parsed signal, when full-frame data is received from the sleep driver; and
   a message processor for checking the parsed signal received from the message parser, and notifying the sleep state controller that a general page message located in the full frame corresponds a null general page message having no paging information and no control information to be updated when the general page message corresponds to the null general page message.

7. The apparatus as claimed in claim 5, wherein the sleep state controller determines the general page message to be the null general page message having no paging information and no control information to be updated, provided that, in the general page message, a Start Of Message (SOM) field has a value of "1," a message length "MSG_LEN" field has a value of "9," a message type "MSG_TYPE" field has a value representing a general page message, updates of a configuration information "CONFIG_MSG_SEQ" field and an access parameter information "ACC_MSG_SEQ" field are unnecessary, and DONE fields including CLASS_0_DONE, CLASS_1_DONE, TMSI_DONE, and BROADCAST_DONE fields and representing whether a corresponding group is paged have a value of "1."

* * * * *